(12) United States Patent
John et al.

(10) Patent No.: US 8,510,230 B2
(45) Date of Patent: Aug. 13, 2013

(54) COHESIVE TEAM SELECTION BASED ON A SOCIAL NETWORK MODEL

(75) Inventors: Ajita John, Holmdel, NJ (US); Ankur Mani, Tempe, AZ (US); Doree Duncan Seligmann, New York, NY (US)

(73) Assignee: Avaya, Inc., Basking Ridge, NJ (US)

( * ) Notice: Subject to any disclaimer, the term of this patent is extended or adjusted under 35 U.S.C. 154(b) by 1614 days.

(21) Appl. No.: 11/560,733

(22) Filed: Nov. 16, 2006

(65) Prior Publication Data

US 2008/0120261 A1     May 22, 2008

(51) Int. Cl.
*G06Q 99/00*     (2006.01)
(52) U.S. Cl.
USPC .......................................................... 705/319
(58) Field of Classification Search
USPC .......................................................... 705/319
See application file for complete search history.

(56) References Cited

U.S. PATENT DOCUMENTS 7,644,144 B1 *  1/2010  Horvitz et al. ................. 709/223

OTHER PUBLICATIONS

Kenneth A. Frank, Identifying Cohesive Subgroups, presented at the Sunbelt Conference, New Orleans, 1994.*
Carolyn J Anderson & Stanley Wasserman, Building Stochastic Blockmodels, Social Networks 14 (1992 137-161.
Kenneth A Frank, Identifying Cohesive Subgroups, Michigan State University, based on paper of the same title presented at the Sunbelt Conference, New Orleans, 1994.

* cited by examiner

*Primary Examiner* — Jonathan Ouellette
*Assistant Examiner* — Maame Ofori-Awuah

(57) ABSTRACT

A method is disclosed that enables the selection of a team of people in an organization, such as a business enterprise, to participate in a task that involves communicating with each other, in which the selection of the team seeks to maximize the team cohesiveness. The illustrative embodiment of the present invention incorporates the use of a social network model to describe the communication pattern in the organization. Based on the relationship between the organization's social network structure and the cohesiveness between the people in the organization, the technique of the illustrative embodiment estimates the dyadic cohesiveness of each pair of people, which is defined as the expected value of relationship strength between each evaluated pair of people. One component of the relationship strength is the number of interactions between the two people in the pair. The technique of the illustrative embodiment then uses the cohesiveness estimates to select teams.

21 Claims, 10 Drawing Sheets

|  |  |
|---|---|
| Highly-active classes, same group | Less-active classes, same group |
| Highly-active classes, different groups | Less-active classes, different groups |

Figure 10

COHESIVE TEAM SELECTION BASED ON A SOCIAL NETWORK MODEL

FIELD OF THE INVENTION

The present invention relates to telecommunications in general, and, more particularly, to selecting a team of people to perform a task, based on the cohesiveness between people as represented in a social network model.

BACKGROUND OF THE INVENTION

In promoting collaborative efforts in a fast-paced environment such as a business enterprise, there is a growing need to quickly bring together a team of people to work on a project or issue. Collaboration is often required to resolve pending issues in a variety of situations—for example, routine situations such as the ordering of items in an inventory and the resolution of claims in an insurance company, life-critical situations such as bringing hospital staff together for an emergency consultation, and time-critical situations such as responding to stock market changes in a brokerage firm. An advantage in being able to bring a team of people together quickly is a reduced delay in starting the team effort, which often results in a reduced delay in making a decision. This can lead to greater enterprise productivity.

A challenge in assembling a team of people is bringing the right combination of people together so that those who are selected will perform effectively together. One quality that is important for team effectiveness is social context, which is the combination of communication and shared knowledge. When people communicate with each other, they share knowledge, which in turn helps them communicate with each other more easily in the future, and so on—in this way, social context accumulates. An effective team shares significant social context.

In reality, team members will often come from different, pre-existing organizations. Whereas the members of a pre-existing organization might work well together because social context that accrues within that organization, two strangers from different organizations might not work as well together because of the lack of social context. On the other hand, two friends from two different organizations might work well together because of their mutual familiarity, even though they do not share much social context from an organizational structure perspective. Again, team effectiveness is closely related to the social context that is present.

What is needed is a technique to evaluate and use the social context of a potential team of people, for the purpose of selecting a team to perform one or more tasks effectively, without some of the disadvantages in the prior art.

SUMMARY OF THE INVENTION

The present invention enables the selection of a team of people in an organization, such as a business enterprise, to participate in a task that involves communicating with each other, in which the selection of the team seeks to maximize the team cohesiveness, which is based on the sharing of social context. The illustrative embodiment of the present invention incorporates the use of a social network model to describe the communication pattern in the organization. Based on the relationship between the organization's social network structure and the cohesiveness between the people in the organization, the technique of the illustrative embodiment estimates the dyadic cohesiveness of each pair of people, which is defined as the expected value of relationship strength between each evaluated pair of people. One component of the relationship strength is the number of interactions between the two people in the pair. Once the cohesiveness estimates are obtained, the technique of the illustrative embodiment then uses the estimates to select teams.

The technique of the illustrative embodiment is based on the intuition that the communication pattern of each individual is influenced by both the personal characteristics of the individual as well as her presence in a particular social circle that describes her relationship with other people in the social network. Specifically, the illustrative embodiment technique incorporates a Bayesian explanation of the communication pattern in the social network and the Bayesian estimate of dyadic cohesiveness between any two individuals in the network. The technique considers the organization as consisting of (i) classes of people, where each class is associated with its own density of incoming and outgoing messages, and (ii) groups of people that communicate more among themselves than with others. In some alternative embodiments, each class is characterized by using another type of interaction characterization, such as being associated with a particular density of favorable and unfavorable interactions.

The disclosed, cohesiveness-based technique of the illustrative embodiment yields advantageous performance in team selection over some techniques in the prior art for various reasons. First, the disclosed technique in the illustrative embodiment assigns probabilities to each evaluated person's membership in each class or group; in contrast, the prior art rigidly associates each person in an organization with a specific class or group. Second, the disclosed technique accounts for the notion that social context is built also by the membership with a social group and not just by the personal interactions; in contrast, prior art techniques that are purely based on interactions between people do not account for that notion. Third, the disclosed technique considers the propagation of cohesiveness between two people that occurs through the communication between other people who are closely interacting with the two people; in contrast, the interactions-based prior art does not consider the cohesiveness propagation.

The illustrative embodiment of the present invention comprises: determining a first expectation of the number of communications from a first person to a second person, wherein said first expectation is based on: i) a first probability, $p_{1 \epsilon c1}$, of the membership of the first person in a first class c1,ii) a second probability, $p_{1 \epsilon c2}$, of the membership of the first person in a second class c2, iii) a third probability, $p_{1 \epsilon g1}$, of the membership of the first person in a first group g1,iv) a fourth probability, $p_{1 \epsilon g2}$, of the membership of the first person in a second group g2, v) a fifth probability, $p_{2 \epsilon c1}$, of the membership of the second person in the first class c1,vi) a sixth probability, $p_{2 \epsilon c2}$, of the membership of the second person in the second class c2, vii) a seventh probability, $p_{2 \epsilon g1}$, of the membership of the second person in the first group g1, and viii) an eighth probability, $p_{2 \epsilon g2}$, of the membership of the second person in the second group g2.

BRIEF DESCRIPTION OF THE DRAWINGS

FIG. 10 depicts a coarse division of possible teams into subsets based upon the class and group memberships of the people in the team.

DETAILED DESCRIPTION

The term "cohesiveness," and its inflected forms, is defined for use in this Specification, including the appended claims, as the sharing of significant social context through past communications activities. Cohesiveness, as it pertains to the illustrative embodiment of the present invention, is described in detail below and with respect to FIG. 2.

Figure 1:
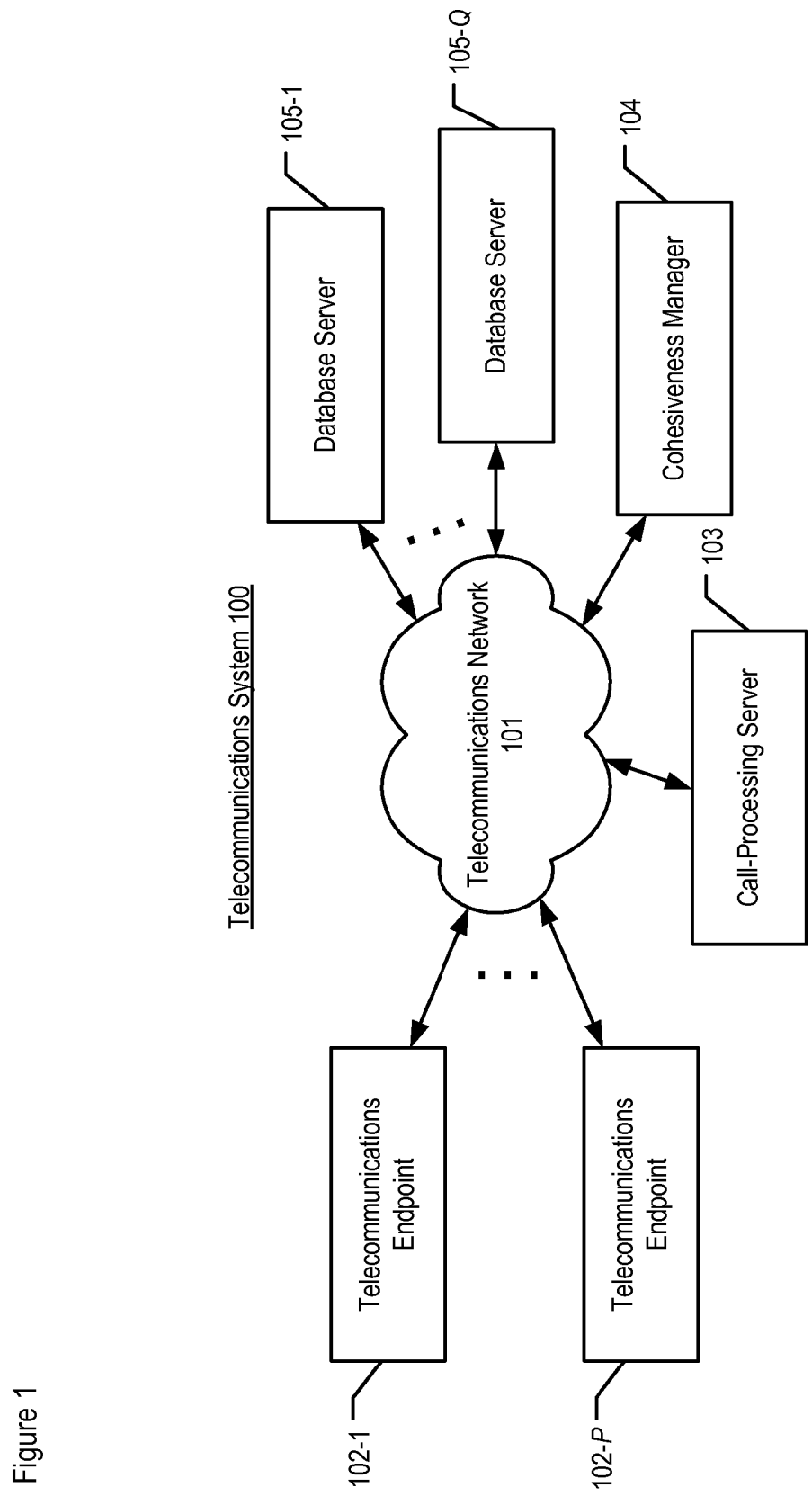
FIG. 1 depicts telecommunications system 100 in accordance with the illustrative embodiment of the present invention.

FIG. 1 depicts telecommunications system 100 in accordance with the illustrative embodiment of the present invention. Telecommunications system 100 comprises telecommunications network 101; telecommunications endpoints 102-1 through 102-P, wherein P is a positive integer; call-processing server 103; cohesiveness manager 104; and database servers 105-1 through 105-Q, wherein Q is a positive integer. The depicted elements of system 100 are interconnected as shown. Telecommunications system 100 is capable of both packet-based and circuit-based switching and transmission of media signals (e.g., voice, video, text, etc.), as is well-known in the art. However, it will be clear to those skilled in the art, after reading this specification, how to apply the present invention to alternative embodiments with all packet-based switching and transmission or all circuit-based switching and transmission.

Telecommunications network 101 is a telecommunications network that comprises one or more of the Internet, the Public Switched Telephone Network (PSTN), and so forth. Network 101 comprises or is connected to one or more transmission-related nodes such as gateways, routers, or switches that are used to direct data packets from one or more sources to the correct destinations of those packets.

Telecommunications endpoint 102-$p$, for $p=1$ through P, is a communications device such as a Plain Old Telephone Service (POTS) telephone, a softphone, an Internet Protocol-based endpoint, a Session Initiation Protocol-based endpoint, a notebook computer, a personal digital assistant (PDA), a tablet computer, and so forth. Each endpoint is capable of originating outgoing communication sessions and receiving incoming communication sessions, in well-known fashion. In addition, each endpoint is capable of communicating via one or more communication media that comprise, but are not limited to voice, audio, video, data, email, instant messaging, other text-based messaging, web, and chat. As those who are skilled in the art will appreciate, in some embodiments endpoints 102-1 through 102-P are capable of handling differing combinations of media, while in some other embodiments the endpoints are all capable of handling the same combination of media. It will be clear to those skilled in the art how to make and use telecommunications endpoints 102-1 through 102-P.

In some embodiments, one or more of endpoints 102-1 through 102-P are also capable of enabling their users to provide information about their communications patterns to one or more of the other elements in system 100. For example, if the user of endpoint 102-1 had a conversation with the user of endpoint 102-2 without the use of system 100, as in a face-to-face conversation, one or both of the users could record information about that conversation (e.g., parties involved, who initiated, start time, duration, subject, etc.) that would be stored at database server 105-$q$. It will be clear to those skilled in the art how to enable a user to enter information about his or her communication patterns.

Call-processing server 103 is a data-processing system that handles call-processing requests from its telecommunications endpoint users, as well as from other users. In handling voice sessions, server 103 reads in and analyzes the dialed digits from telecommunications endpoint 102-$p$, and processes the corresponding call-setup request. In handling instant-messaging or email sessions, server 103 receives text-based communications from users and routes those communications to the specified recipients. Server 103 also tracks the "presence" of each user, as is known in the art, at the endpoints and on the various communication media. Whenever a first user communicates with a second user, server 103 writes information about the communication (e.g., type of medium, parties involved, who initiated, start time, duration, subject, etc.) to one or more database servers 105-1 through 105-Q, where the information is stored as part of a call log or equivalent. Call-processing server 103 is also capable of receiving, from cohesiveness manager 104, requests to set up endpoints on communication sessions.

Although a single call-processing server is depicted, it will be clear to those skilled in the art, after reading this specification, how to make and use alternative embodiments of the present invention with multiple call-processing servers present—for example, a first server for voice, a second server for instant messaging, a third for email, and so forth. In any event, it will be clear to those skilled in the art how to make and use call-processing server 103.

Cohesiveness manager 104 is a server data-processing system that estimates the cohesiveness between various people (e.g., users of telecommunications endpoints 102-1 through 102-P, etc.) and uses the cohesiveness estimates to select teams of people, in accordance with the illustrative embodiment of the present invention. Cohesiveness manager 104 is capable of accessing database servers 105-1 through 105-Q for the purpose of acquiring information about communications between people and is capable of receiving that information from the database servers. In the illustrative embodiment, cohesiveness manager 104 operates in accordance with the Internet Protocol for the purpose of transmitting and receiving information. In some alternative embodiments, as those who are skilled in the art will appreciate, cohesiveness manager 104 can operate in accordance with a different protocol.

In accordance with the illustrative embodiment, cohesiveness manager 104 determines the cohesiveness between people, the details of which are described below and with respect to the subsequent figures. As those who are skilled in the art will appreciate, the functionality described in this specification with respect to cohesiveness manager 104 can alternatively be implemented in a data-processing system that is other than a server. In some other embodiments, the cohesiveness manager functionality might be co-located with other functionality, such as the database functionality or the call-processing functionality. In any event, it will be clear to those who are skilled in the art, after reading this specification, how to make and use cohesiveness manager 104.

Database server 105-$q$, for $q=1$ through Q, is a data-processing system that fulfills communications log access requests from its users. Each database server is capable of collecting information about communications between people (e.g., type of medium, parties involved, who initiated, start time, duration, subject, etc.) and maintaining communications logs for those communication sessions. In some embodiments, each database server accumulates and stores communication logs for a specific type of communication medium; for example, server 105-1 might store the logs for voice communications, while server 105-2 stores the logs for instant messaging communications, while server 105-3 stores the logs for email, and so forth. In some other embodiments, the database functionality might be co-located with other functionality, such as the cohesiveness management functionality or the call-processing functionality. It will be clear to those skilled in the art how to make and use database servers 105-1 through 105-Q.

Figure 2:
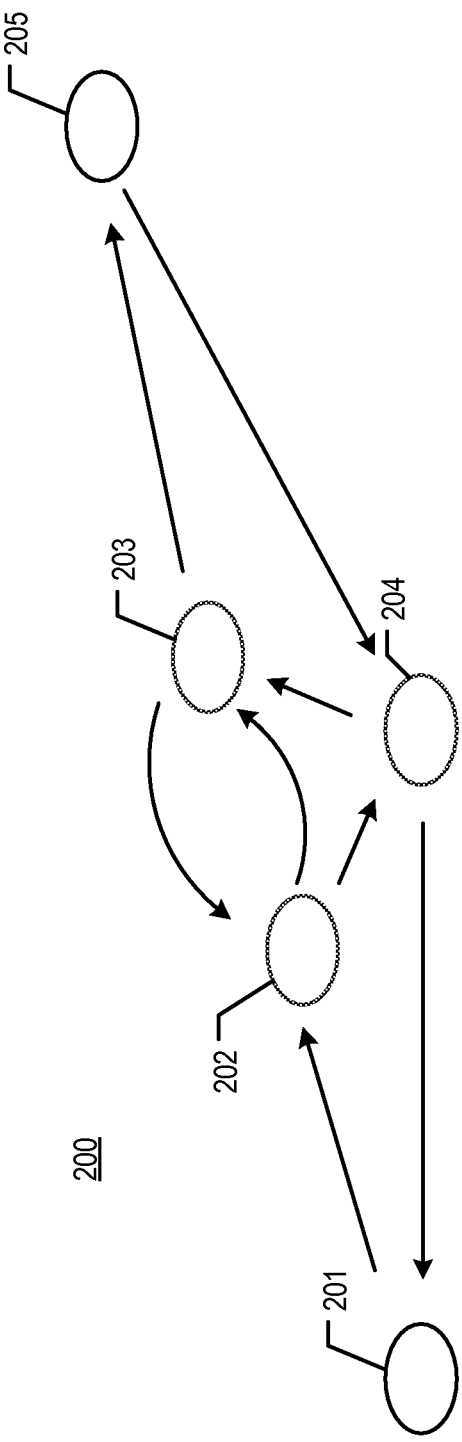
FIG. 2 depicts social network 200, which is made up of people, and the flow of communications among the people in the network.

Cohesiveness Overview—FIG. 2 depicts social network 200, which comprises persons 201 through 205, and also depicts the flow of communications, denoted by arrows, among the people in the network. Persons 201 through 205 are members of an organization, such as a business enterprise, in which communications is typically anti-symmetrical. For example, sometimes two people, such as persons 202 and 203, both send to and receive from each other. Sometimes a first person, such as person 201, receives communications from a second person, such as person 204, but does not send communications to that second person. And sometimes two people, such as persons 201 and 205, might both communicate with a third person, such as person 204, even though they do not communicate directly with each other. In addition, some people might be associated with a lighter amount of incoming or outgoing communications traffic, while others might be associated with a heavier amount of incoming or outgoing traffic.

Communication activities between users in an enterprise take place using a variety of media such as face-to-face, email, instant messaging (IM), and voice. Depending on the domain, one or more of these media might be used more predominantly than others. For example, face-to-face interactions might be more prevalent in geographically co-located development and research organizations. In contrast, contact center and sales team interactions might involve a customer calling an agent on a voice interaction and subsequently, initiate text chats with an expert walking the floor of a retail store using a Personal Digital Assistant. The interactions in an enterprise form communities that can transcend organizational and geographical boundaries and additionally, characterize people differently based on their communication activity levels and patterns.

Cohesiveness in a network such as network 200 can build up as a result of effective group and personal communications. There can be several dimensions to effectiveness in communication activities. Context and media are two dimensions. For example, a group of people might interact effectively on software technologies but might interact poorly on policies for software use and a group may communicate effectively face-to-face but might not do well on email.

Thus, effective communication activities foster community building and indicate cohesiveness through people's choices of partner selections for communication tasks, as well as foster other communication. With respect to effective communication, it is accounted for in the illustrative embodiment that two different people may share social context by their group identity, even though they do not communicate directly-as is the case with person 201 and 205, for example. Due to this social context, two people who have never communicated earlier are still able to communicate effectively and demonstrate cohesiveness.

Figure 3:
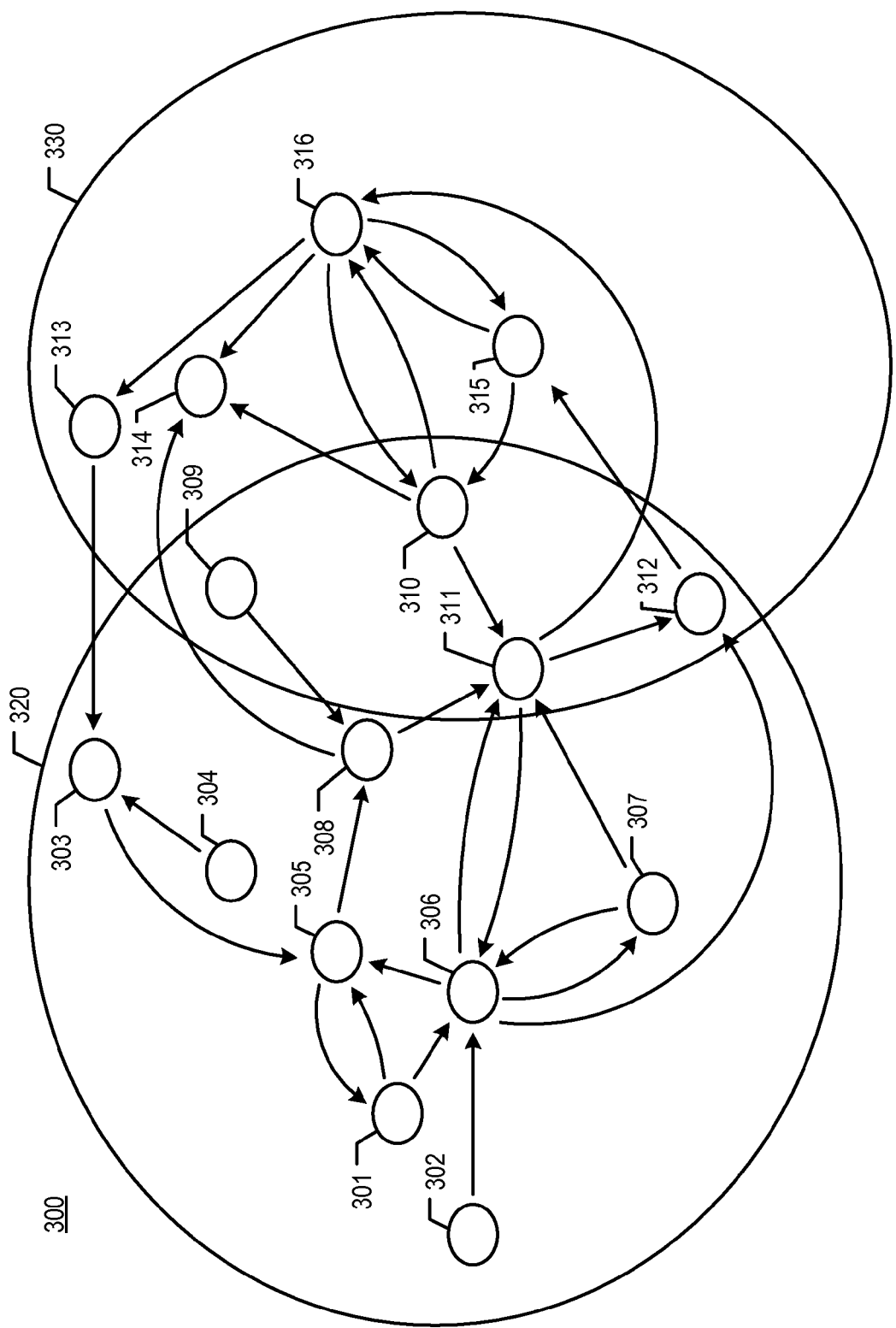
FIG. 3 depicts network 300, which is an example of an organization's social network.

Social Network Model—FIG. 3 depicts social network 300, which is an example of another organization's social network than that represented in FIG. 2. Network 300 comprises persons 301 through 316, and depicts the flow of communications, denoted by arrows, among the people in the network. In addition, some people are associated with a lighter amount of incoming or outgoing communications traffic, while others are associated with a heavier amount of incoming or outgoing traffic.

In the illustrative embodiment, a Bayesian model for social interaction is used that considers both the interaction characteristics of the people and the characteristics of the social group to which the people belong. In a social interaction, each person might send communications (e.g., messages, etc.) to one or more other people and might receive communications from one or more other people. For the purposes of this specification, the term "popularity," and its inflected forms, is defined as the density of incoming communications and the term "communication activity," and its inflected forms, is defined as the density of outgoing communications. An organization consists of "classes" of people based upon their level of popularity and communication activity and "groups" of people that communicate more among themselves than with others, as shown in FIG. 3.

Each member in a class is characterized by the same distribution of the incoming and outgoing interactions over a given period in time. Thus, each member in a class is stochastically similar to others with respect to the density of incoming and outgoing communications. As depicted in FIG. 3, for example, persons 305, 306, 310, and 311 are members of a first class of people who exhibit a high density of communications; persons 307, 308, 314, and 315 are members of a second class of people who exhibit a medium density of communications; and the other people shown are members of a third class of people who exhibit a low density of communications. In some embodiments, each class is characterized in terms of both the magnitude of communications (i.e., high, medium, and low) and the direction of communications (i.e., incoming and outgoing). As those who are skilled in the art will appreciate, in some alternative embodiments other characterizations of class are possible, such as each class being associated with a particular density of favorable and unfavorable interactions.

Each member in a group is characterized by the same distribution of the incoming and outgoing interactions within the group and outside the group. Thus, each member in a group is stochastically similar to others with respect to the people she interacts with. As depicted in FIG. 3, the people appearing toward the left side of the figure tend to be associated more with social group 320, while the people appearing toward the right side of the figure tend to be associated more with social group 330. However, as will be discussed shortly, in the illustrative embodiment it is not necessary or even advantageous that a person be rigidly associated with one social group or another.

People's communication patterns are explained both by their levels of popularity and communication activity, as well as by the social group to which they belong. As seen in FIG. 3, people's membership in one social group or another or in one class or another is often uncertain. Therefore, the model of the illustrative embodiment does not distribute people in a certain class or group, as with some techniques in the prior art, but instead it assigns probabilities to the people's membership in a class or group. For C classes and G groups, person i belongs to (i.e., is a member of) a class c and a group g with probabilities $p_{i \in c}$ and $p_{i \in g}$, respectively. For each person, a class-group membership matrix is defined as C-G membership given by:

$$\begin{bmatrix} p_{i \in c_1} p_{i \in g_1} & \cdots & & \cdots & p_{i \in c_1} p_{i \in g_G} \\ \vdots & \vdots & p_{i \in c_j} p_{i \in g_k} & \vdots & \vdots \\ p_{i \in c_C} p_{i \in g_1} & \cdots & & \cdots & p_{i \in c_C} p_{i \in g_G} \end{bmatrix} = \overline{p}_{i \in c} \overline{p}_{i \in g}^T \quad \text{(Eq. 1)}$$

The interaction characteristics of the classes and groups are assumed to be uniform across all the members of the group or class. For a member i belonging to a class c, the distribution of the number of outgoing interactions over a fixed time period is approximated as a Gaussian distribution, given by:

$$p_{i_{out}}(n | i \in c) = \frac{1}{K_{c_{out}} \sqrt{2\pi\sigma_{c_{out}}^2}} e^{-\frac{(n-\mu_{c_{out}})^2}{2\sigma_{c_{out}}^2}}, \quad \text{(Eq. 2)}$$

where:
i. n is the number of outgoing communications;
ii. $\mu_{c_{out}}$ is the mean number of outgoing interactions;
iii. $\theta_{c_{out}}^2$ is the variance of the number of interactions; and
iv. $K_{c_{out}}$ is a normalizing constant to account for the fact that n>0.

Similarly, the probability for the incoming interactions is given as:

$$p_{i_{in}}(n | i \in c) = \frac{1}{K_{c_{in}} \sqrt{2\pi\sigma_{c_{in}}^2}} e^{-\frac{(n-\mu_{c_{in}})^2}{2\sigma_{c_{in}}^2}}. \quad \text{(Eq. 3)}$$

For a member i belonging to a group g, the ratio of outgoing communications going to members within the same group to all the outgoing communications, has a Gaussian distribution:

$$p_{i \to g / i_{out}}(r | i \in g) = \frac{1}{K_{g_{out}} \sqrt{2\pi\sigma_{g_{out}}^2}} e^{-\frac{(r-\mu_{g_{out}})^2}{2\sigma_{g_{out}}^2}}, \quad \text{(Eq. 4)}$$

where:
i. 0<r<1 is the ratio;
ii. 0<$\mu_{g_{out}}$<1 is the mean ratio;
iii. $\theta_{g_{out}}^2$ is the variance of the ratio; and
iv. $K_{g_{out}}$ is the normalizing constant.
The communications from a member i that are going outside her group are equally likely to go to any other group. Thus, the ratio of outgoing communications from member i that are going to a group $g_k$ to all of the outgoing communications from i, when i does not belong to group $g_k$, then has a distribution:

$$p_{i \to g_k / i_{out}}(r | i \notin g_k, i \in g) = \frac{1}{K_{g_{out}} \sqrt{2\pi\sigma_{g_{out}}^2 / (G-1)}} e^{-\frac{((1-r)-\mu_{g_{out}}/(G-1))^2}{2\sigma_{g_{out}}^2 / (G-1)}}. \quad \text{(Eq. 5)}$$

Similarly, the probability of the ratio of incoming communications from inside the group to all of the incoming communications is:

$$p_{g \to i / i_{in}}(r | i \in g) = \frac{1}{K_{g_{in}} \sqrt{2\pi\sigma_{g_{in}}^2}} e^{-\frac{(r-\mu_{g_{in}})^2}{2\sigma_{g_{in}}^2}}. \quad \text{(Eq. 6)}$$

The communications to a member i that are coming from outside i's group are equally likely to come from any other group. Thus, the ratio of incoming communications to i from a group $g_k$ to all the incoming communications to i, when i does not belong to group $g_k$, has a distribution:

$$p_{g_k \to i / i_{in}}(r | i \notin g_k, i \in g) = \frac{1}{K_{g_{in}} \sqrt{2\pi\sigma_{g_{in}}^2 / (G-1)}} e^{-\frac{((1-r)-\mu_{g_{in}}/(G-1))^2}{2\sigma_{g_{in}}^2 / (G-1)}}. \quad \text{(Eq. 7)}$$

Accordingly, each individual's interaction characteristics and her group characteristics are mixture models. The distribution of outgoing interactions for the member i is given as:

$$p_{i_{out}}(n) = \sum_{j=1}^{C} p_{i \in c_j} p_{i_{out}}(n | i \in c_j). \quad \text{(Eq. 8)}$$

Similarly, the distribution of incoming interactions for the member i is given as:

$$p_{i_{in}}(n) = \sum_{j=1}^{C} p_{i \in c_j} p_{i_{in}}(n | i \in c_j). \quad \text{(Eq. 9)}$$

Figure 4:
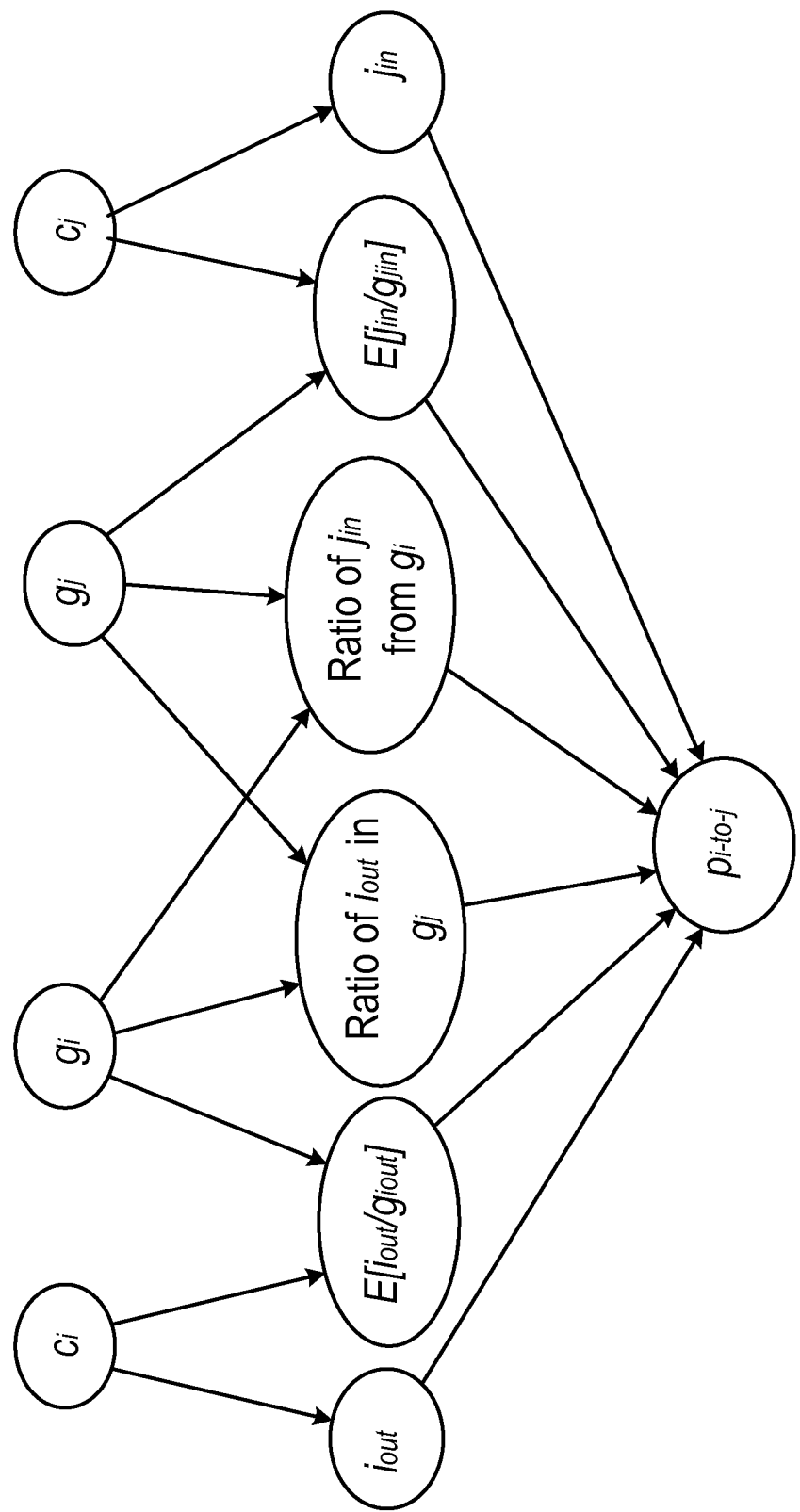
FIG. 4 depicts a Bayesian belief network, in accordance with the illustrative embodiment of the present invention.

The distribution of the number of communications from the member i to member j depends upon the classes and groups of both members. This dependency structure is captured in the Bayesian belief network shown in FIG. 4. Specifically, the depicted dependency structure represents the number of interactions from member i to j. $E[i_{out}/g_{i_{out}}]$ represents the expected ratio of the outgoing communications from i to the number of all outgoing communications from $g_i$. $E[j_{in}/g_{j_{in}}]$ represents the expected ratio of the incoming communications to j to the number of all incoming communications to $g_j$. The structure of the Bayesian network allows the factorization of the joint and the marginal, as is now described.

The distribution of communications from member i to member j is thus computed as a marginal over all other variables as:

$$p_{i \to j}(n) = \int_{M,N>n} p_{i \to j}(n, i_{out} = M, j_{in} = N) dM dN \quad \text{(Eq. 10)}$$

$$= \int_{M,N>n} p_{i_{out}}(M) p_{i \to j}(n|i_{out} = M) p_{j_{in}}$$

$$(N|i \to j = n) dM dN$$

$$= \int_M p_{i_{out}}(M) p_{i \to j}(n|i_{out} = M) dM$$

$$\int_N \frac{p_{j_{in}}(N) p_{i \to j}(n|j_{in} = N)}{p_{i \to j}(n)} dN$$

Therefore, $p_{i \to j}(n)$ can be expressed as the geometric mean of two integrals, as follows:

$$p_{i \to j}(n) = \sqrt{\begin{array}{c} \int_M p_{i_{out}}(M) p_{i \to j}(n|i_{out} = M) dM \\ \int_N p_{j_{in}}(N) p_{i \to j}(n|j_{in} = N) dN \end{array}}, \quad \text{(Eq. 11)}$$

where the conditional distributions are given as, $$p_{i \to j}(n|i_{out} = M) = \left( p_{i \to g_l}(r/M|i \in g_k) \quad \text{(Eq. 12)} \right.$$

$$\left. \sum_{k=1}^{G} p_{i \in g_k} \sum_{l=1}^{G} \int_n^M \left( \frac{p_{j \in g_l} \mu_{j_{in}}}{C_{g_{lin}}} \right)^n \left( 1 - \frac{p_{j \in g_l} \mu_{j_{in}}}{C_{g_{lin}}} \right)^{r-n} dr \right)$$

where:
  i. $\mu_{j_{in}}$ is the expected number of incoming communications for member j over the distribution given by Equation 9; and
  ii. $Cg_{lin}$ is the normalizing constant.
Similarly, $$p_{i \to j}(n|j_{in} = N) = \left( p_{g_k \to j}(r/N|j \in g_l) \quad \text{(Eq. 13)} \right.$$

$$\left. \sum_{l=1}^{G} p_{j \in g_l} \sum_{k=1}^{G} \int_n^M \left( \frac{p_{i \in g_k} \mu_{i_{out}}}{C_{g_{lout}}} \right)^n \left( 1 - \frac{p_{i \in g_k} \mu_{i_{out}}}{C_{g_{lout}}} \right)^{r-n} dr \right)$$

where:
  i. $\mu_{i_{out}}$ is the expected number of outgoing communications for member j over the distribution given by Equation 8; and
  ii. $Cg_{lout}$ is the normalizing constant (i.e., the expected number of outgoing interactions from $g_l$).

Inherent in the illustrative embodiment is that the likelihood that an incoming communication will go to a member in the group is proportional to the expected value of the number of incoming communications for the member. Also, the likelihood that any communication originating from the group, originated from a particular member is proportional to the expected value of the number of outgoing communications from the member. This gives the combinatorial form for the distributions in Equations 12 and 13. The form of the distribution of communications from member i to j is then obtained in an analytical form using integration by parts as:

$$p_{i \to j}(n) = \sum_{o=1}^{C} \sum_{p=1}^{C} \sum_{k=1}^{G} \sum_{l=1}^{G} const_{o,p,k,l} \text{erf}^2(a_{o,p,k,l} * n - b_{o,p,k,l}). \quad \text{(Eq. 14)}$$

Overview of Tasks—FIGS. 5 through 9 depict flowchart diagrams of the salient tasks for determining the cohesiveness between people and for using the cohesiveness information to select a team, in accordance with the illustrative embodiment of the present invention. As those who are skilled in the art will appreciate, some of the events that appear in FIGS. 5 through 9 can occur in parallel or in a different order than that depicted.

Figure 5:
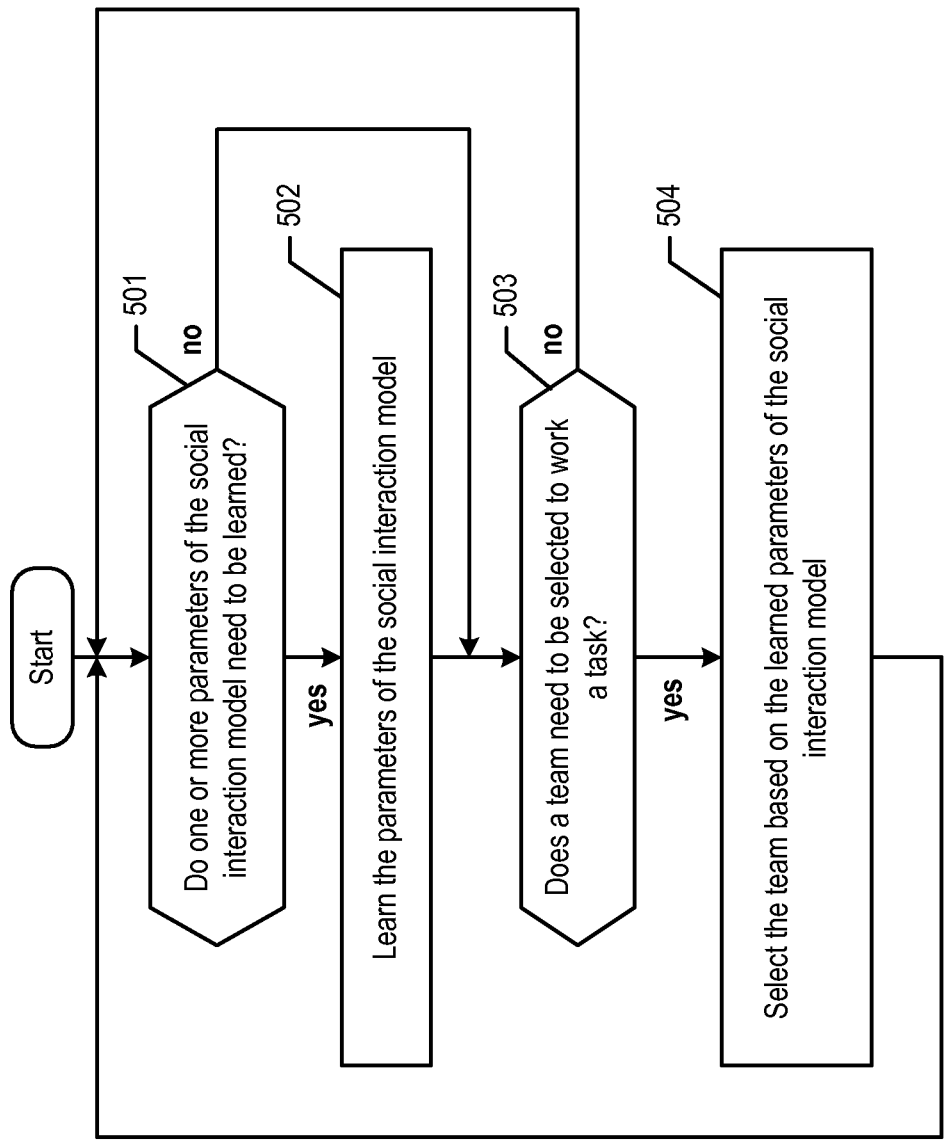
FIG. 5 depicts a flowchart diagram of the salient tasks performed by cohesiveness manager 104, which is a part of system 100, for determining the cohesiveness between people and for using the cohesiveness information to select a team, in accordance with the illustrative embodiment of the present invention.

FIG. 5 depicts a flowchart diagram of the salient tasks performed by cohesiveness manager 104 for determining the cohesiveness between people and for using the cohesiveness information to select a team, in accordance with the illustrative embodiment of the present invention.

At task 501, manager 104 checks if the model has to be learned. This can occur, for example, during initialization or when information that affects the model has changed. If the model has to be learned (or relearned), task execution proceeds to task 502. If the model does not have to be learned, task execution proceeds to task 503.

At task 502, manager 104 learns or updates the model using a socio-matrix of the organization that describes the interactions between all of the people in the organization. In accordance with the illustrative embodiment, the parameters to be learned are:
  i. the means and variances of the class distributions;
  ii. the means and variances of the group distributions; and
  iii. the C-G membership matrix for each person, as depicted in Equation 1.

The C-G membership matrix can be factored into (Class membership vector)*(Group membership vector), as shown in Equation 1. Therefore, to determine the C-G membership matrix, it is sufficient to obtain these two vectors independently. In addition, the class behaviors and group behaviors are mutually independent and can be learned independently. The parameters are learned independently using the Expectation Maximization (EM) algorithm, as is known in the art. As those who are skilled in the art will appreciate, however, in some alternative embodiments the parameters can be learned using a technique other than one that involves the EM algorithm. When applying the EM algorithm, it is important to initialize the parameters suitably because the EM algorithm provides a locally optimal solution. For example, one way to initialize the parameters is by using prior knowledge about the organization's structure.

The algorithms for learning the class and group parameters are described in detail below and with respect to FIGS. 6, 7, and 8.

At task 503, manager 104 checks if a team needs to be selected. The need can occur, for example, when someone wants to assemble a group of people to work a problem. If a team needs to be selected, task execution proceeds to task 504. If a team does not need to be selected, task execution proceeds to task 501.

At task 504, manager 104 selects a team based on the model learned in task 502. In accordance with the illustrative embodiment, manager 104 selects a team of people for a given task such that the expected number of interactions within the team of people for the given task is maximized. The salient tasks for team selection are described below and with respect to FIG. 9.

After task 504, task execution proceeds back to task 501.

Figure 6:
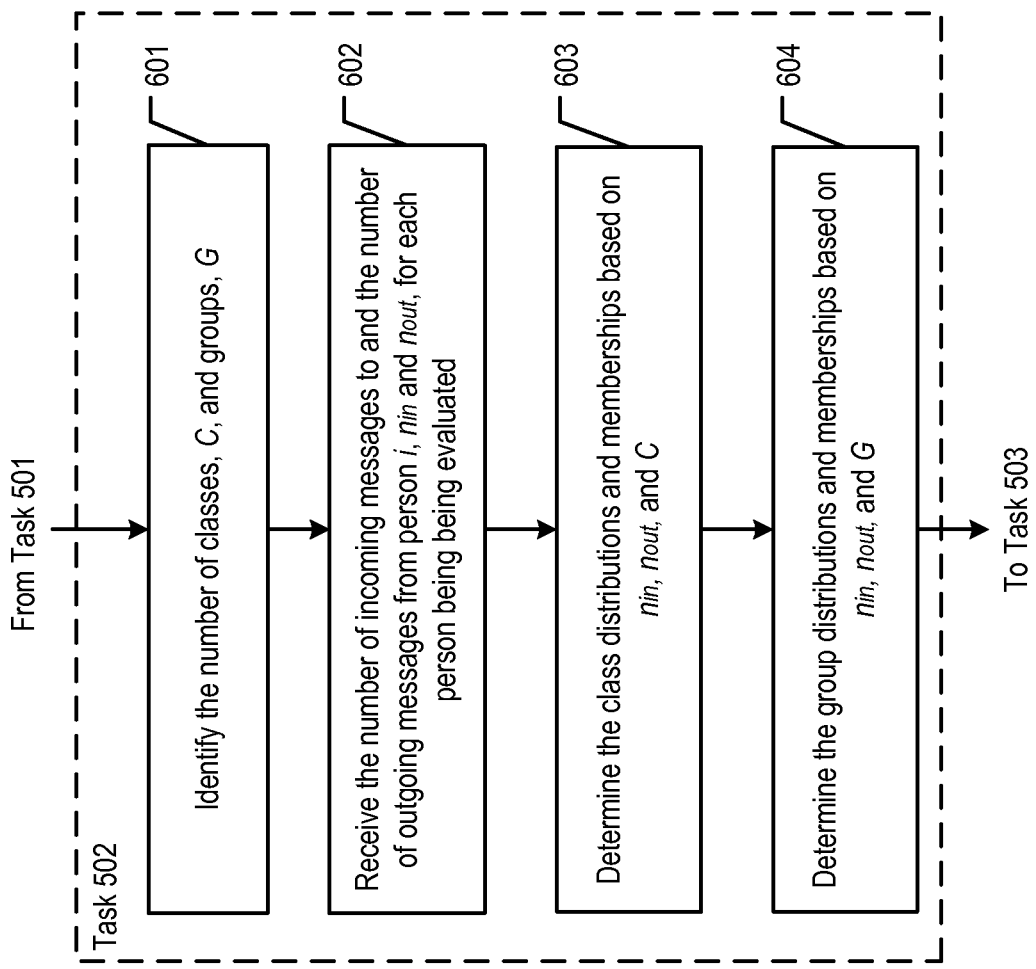
FIG. 6 depicts manager 104 learning the social network model for determining cohesiveness, in accordance with the illustrative embodiment of the present invention.

Learning the Social Network Model—FIG. 6 depicts manager 104 learning the social network model for determining cohesiveness, in accordance with the illustrative embodiment of the present invention.

At task 601, manager 104 identifies the number of classes and groups to consider in the model. For example, manager 104 can fix the number of classes, C, and the number of groups, G, by using analysis performed on the organization's email logs (or other communication logs) during a particular month (or other period of time) and by observing communication patterns in those logs. As those who are skilled in the art will appreciate, other techniques exist for determining the number of classes and groups.

At task 602, manager 104 receives from database server 105-$q$ logged information about communications that have occurred over a given period of time between all pairs of people (i.e., members) in the organization. It is from this received information, for each member i, that a set of communication statistics is derived that comprises:

i. the number of outgoing communications from member i, $n_{i_{out}}$;
ii. the number of incoming communications to member i, $n_{i_{in}}$;
iii. one or more ratios of outgoing communications from member i; and
iv. one or more ratios of incoming communications to member i.

In some alternative embodiments, manager 104 receives from database server 105-$q$, or from some other device, the set of communication statistics itself.

At task 603, manager 104 learns the model for class distributions and memberships. These parameters are based, in part, on the rate of incoming and outgoing communications for each person, assumed to be a mixture of Gaussian distributions as discussed earlier and with respect to the social network model described earlier and with respect to FIG. 3. Each mode of a mixture corresponds to a class, and the weight of the mode is the membership of the person in that class. The Expectation Maximization (EM) algorithm for learning the class parameters and the posteriors is described below and with respect to FIGS. 7 and 8.

At task 604, manager 104 learns the model for group distributions and memberships. The observations for the group parameters are the ratio of incoming and outgoing communications for each person going to other members in the group to all the incoming and outgoing communications for the person, which is assumed to be a mixture of Gaussian distributions as discussed earlier for the social network model. Each mode of a Gaussian corresponds to a group, and the weight of the mode is the membership of the person to that group. The EM learning algorithm for group parameters is modified in comparison to how it is used for class parameters because the observation is itself hidden; the algorithm is described below and with respect to FIG. 8.

Figure 7:
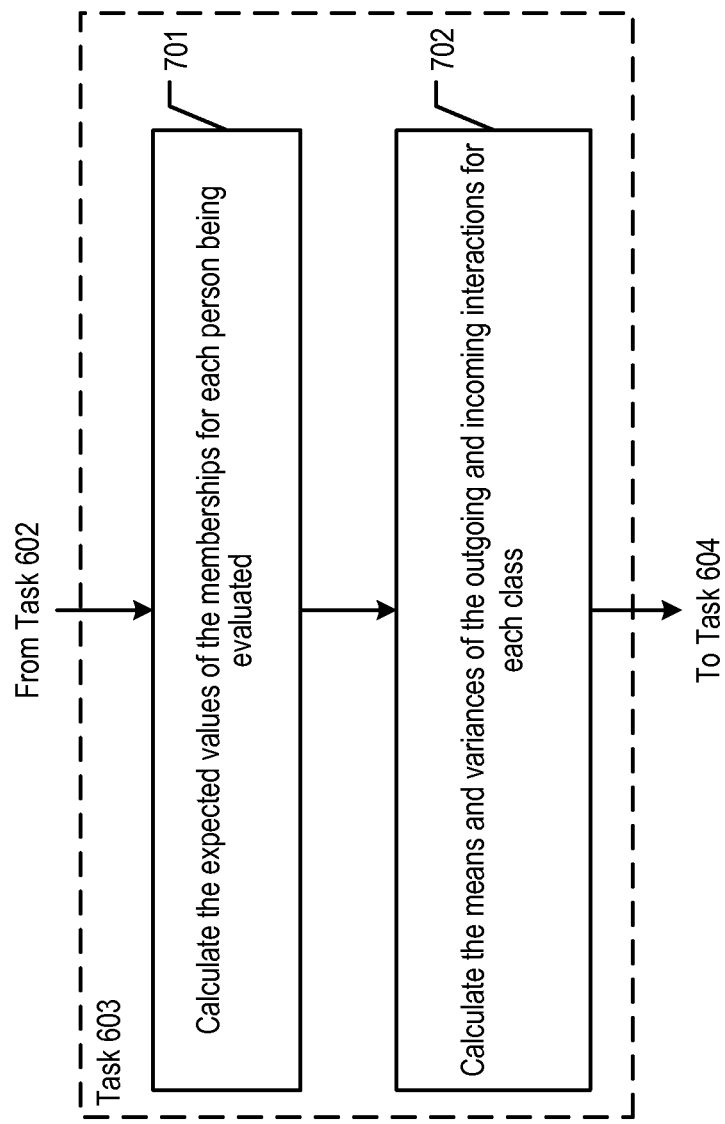
FIG. 7 depicts the salient tasks performed by cohesiveness manager 104 in determining class distributions and memberships, in accordance with the illustrative embodiment of the present invention.

FIG. 7 depicts the salient tasks performed by cohesiveness manager 104 in determining class distributions and memberships, in accordance with the illustrative embodiment of the present invention.

At task 701, manager 104 determines the membership of a person i in class $c_k$ as:

$$p_{i \in c_k} = \frac{p_{i_{out}}(n_{i_{out}} | i \in c_k) p_{i_{in}}(n_{i_{in}} | i \in c_k)}{\sum_{k=1}^{C} p_{i_{out}}(n_{i_{out}} | i \in c_k) p_{i_{in}}(n_{i_{in}} | i \in c_k)}, \quad \text{(Eq. 15)}$$

where $n_{i_{out}}$ and $n_{i_{in}}$ are the number of outgoing and incoming communications observed for member i in the socio-matrix and were acquired at task 602. In some embodiments, the classes can be further factorized into classes by popularity and classes by communication activity; where this is the case, the class space is the Cartesian product of the class spaces by communication activity and popularity. Accordingly, equation 15 can be factorized as:

$$p_{i \in c_k} = \quad \text{(Eq. 16)}$$

$$p_{i \in c_{x,out}} p_{i \in c_{y,in}} = \frac{p_{i_{out}}(n | i \in c_{x,out})}{\sum_{x=1}^{\sqrt{C}} p_{i_{out}}(n | i \in c_{x,out})} \frac{p_{i_{in}}(n | i \in c_{y,in})}{\sum_{y=1}^{\sqrt{C}} p_{i_{in}}(n | i \in c_{y,in})},$$

where $c_{x,out}$ and $c_{y,in}$ are the classes by communication activity and popularity, respectively.

At task 702, manager 104 determines the means and variances of the outgoing and incoming interactions for a class c as follows:

$$\mu_{c_{out}} = \frac{\sum_{i=1}^{numberOfPeople} p_{i \in c} n_{i_{out}}}{\sum_{i=1}^{numberOfPeople} p_{i \in c}}; \quad \text{(Eq. 17)}$$

$$\sigma^2_{c_{out}} = \frac{\sum_{i=1}^{numberOfPeople} (n_{i_{out}} - \mu_{c_{out}})^2 p_{i \in c}}{\sum_{i=1}^{numberOfPeople} p_{i \in c}}$$

$$\mu_{c_{in}} = \frac{\sum_{i=1}^{numberOfPeople} p_{i \in c} n_{i_{in}}}{\sum_{i=1}^{numberOfPeople} p_{i \in c}}; \quad \text{(Eq. 18)}$$

$$\sigma^2_{c_{in}} = \frac{\sum_{i=1}^{numberOfPeople} (n_{i_{in}} - \mu_{c_{in}})^2 p_{i \in c}}{\sum_{i=1}^{numberOfPeople} p_{i \in c}}$$

Manager 104 determines the means and variances by using the probability, $p_{i \in c}$, of class membership of a person i in class c determined at task 701. The parameter values determined from Equations 17 and 18 can then be used in Equations 2 and 3, respectively, as part of cohesive team selection, which is described below and with respect to FIG. 9.

Figure 8:
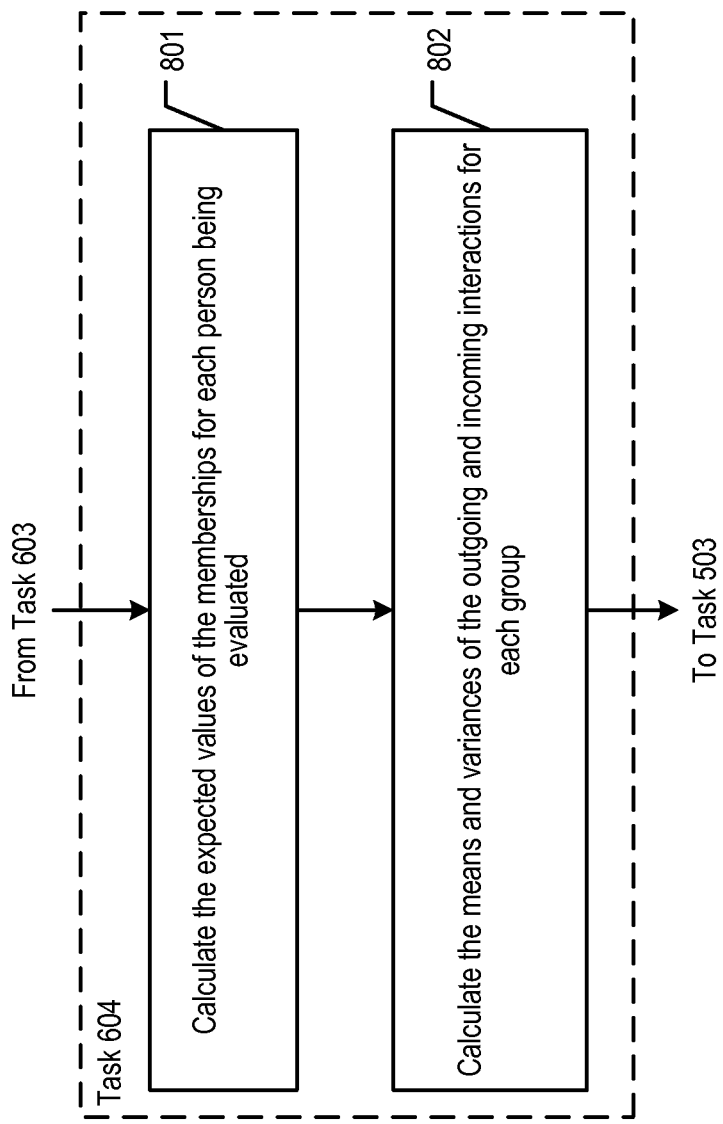
FIG. 8 depicts the salient tasks performed by cohesiveness manager 104 in determining group distributions and memberships, in accordance with the illustrative embodiment of the present invention.

FIG. 8 depicts the salient tasks performed by cohesiveness manager 104 in determining group distributions and memberships, in accordance with the illustrative embodiment of the present invention.

At task 801, cohesiveness manager 104 determines the group membership, but does so in a different manner than for class membership, as described with respect to task 601. The group membership of a person i in group $g_l$ is given by:

$$p_{i \in g_l} = \frac{p_{i \to g_l/i_{out}}(r_{i \to g_l}|i \in g_l) p_{g_l \to i/i_{in}}(r_{g_l \to i}|i \in g_l)}{\sum_{l=1}^{G} p_{i \to g_l/i_{out}}(r_{i \to g_l}|i \in g_l) p_{g_l \to i/i_{in}}(r_{g_l \to i}|i \in g_l)} \quad \text{(Eq. 19)}$$

The ratios $r_{i \to g}$ and $r_{g \to i}$ are described above and with respect to Equations 5 and 6 and Equations 7 and 8, respectively. The ratios $r_{i \to g}$ and $r_{g \to i}$, however, depend upon the group memberships of all other people in the organization. Therefore, the group memberships of one person in the organization cannot be determined independently of the group memberships of other members in the organization. Consequently, the joint group membership vector $[g_{of1} \ldots g_{ofnumPeople}]^T$ has a very large space (numPeople)$^{numGroups}$, and determining the distribution in this space $p([g_{of1} \ldots g_{ofnumPeople}]^T)$ is computationally intensive. Of particular significance is that it is sufficient only to determine the marginals over the joint membership vector distribution, $p(g_{ofi})$ for each member i. Accordingly, manager 104 uses Markov Chain Monte Carlo (MCMC) simulations, in particular Metropolis-Hastings algorithm, as is known in the art, to compute the group memberships. A special case of the Metropolis-Hastings algorithm (Gibbs sampling) is known in the art for learning the stochastic blockstructures. This technique also provides the expected value of the ratios for each member i and each group $g_i$.

At task 802, manager 104 determines the mean and variances of the ratio of outgoing and incoming interactions for each group as follows:

$$\mu_{g_{out}} = \frac{\sum_{i=1}^{numberOfPeople} (r_{i \to g}) p_{i \in g}}{\sum_{i=1}^{numberOfPeople} p_{i \in g}}; \quad \text{(Eq. 20)}$$

$$\sigma^2_{g_{out}} = \frac{\sum_{i=1}^{numberOfPeople} (r_{i \to g} - \mu_{g_{out}})^2 p_{i \in g}}{\sum_{i=1}^{numberOfPeople} p_{i \in g}}$$

$$\mu_{g_{in}} = \frac{\sum_{i=1}^{numberOfPeople} (r_{g \to i}) p_{i \in g}}{\sum_{i=1}^{numberOfPeople} p_{i \in g}}; \quad \text{(Eq. 21)}$$

$$\sigma^2_{g_{in}} = \frac{\sum_{i=1}^{numberOfPeople} (r_{g \to i} - \mu_{g_{in}})^2 p_{i \in g}}{\sum_{i=1}^{numberOfPeople} p_{i \in g}}$$

Manager 104 determines the means and variances by using the probability, $p_{i \in g}$, of group membership of a person i in group g determined at task 801. The parameter values determined from Equations 20 and 21 can then be used in Equations 4 and 6, respectively, as part of cohesive team selection, which is described below and with respect to FIG. 9.

Figure 9:
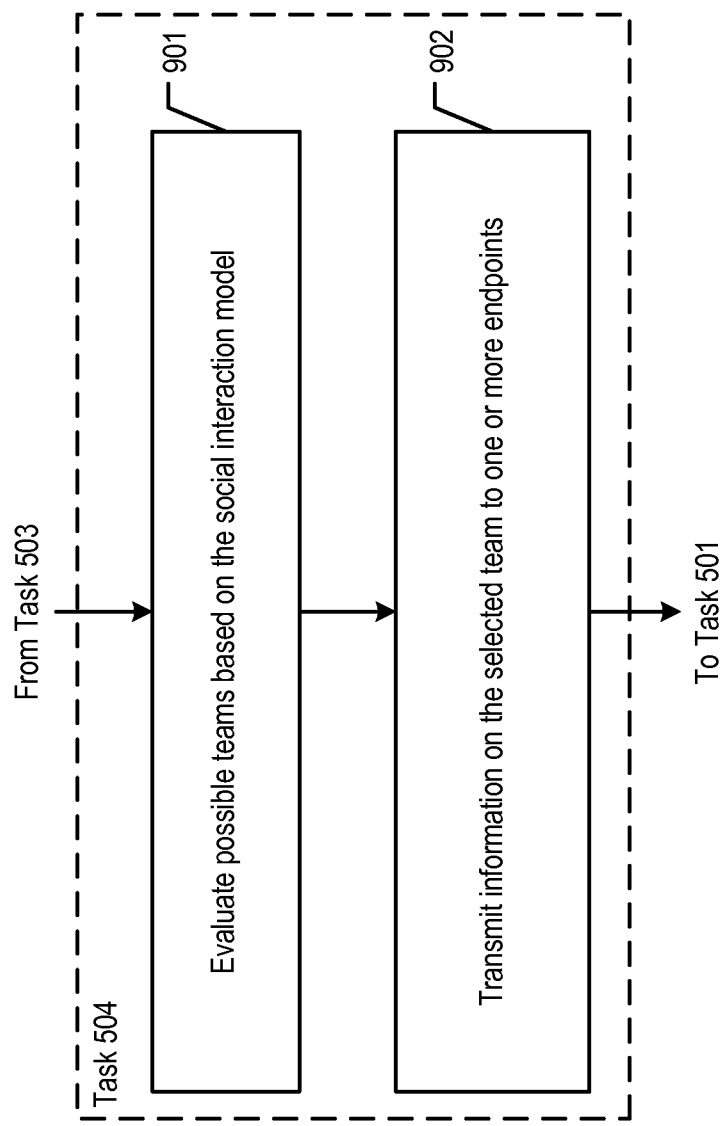
FIG. 9 depicts the salient tasks performed by cohesiveness manager 104 in selecting a team of people based on cohesiveness, in accordance with the illustrative embodiment of the present invention.

Cohesive Team Selection—FIG. 9 depicts the salient tasks performed by cohesiveness manager 104 in selecting a team of people based on cohesiveness, in accordance with the illustrative embodiment of the present invention.

At task 901, cohesiveness manager 104 evaluates multiple combinations of people as candidate members for teams. To understand how manager 104 performs the evaluation, it is important to understand the problem of cohesive team selection, which is described as follows. Given the set of n available people who are skilled to perform a task, one goal is to find a team S such that:

$$S = \underset{S}{\mathrm{argmax}} \left( \sum_{i \in S, j \in S} E[i \to j] \right). \quad \text{(Eq. 22)}$$

where the size of the team is less than n and the expectation of the number of interactions (communications) between people is computed for the distribution given in Equations 11 and 14. The expectation is a sum of terms in the form:

$$E[i \to j] = const \int_0^\infty n(\mathrm{erf}(n))^2 \, dn. \quad \text{(Eq. 23)}$$

This expectation is computed numerically as the integral cannot be solved analytically. Finding the optimal solution for Equation 22 can computationally intensive as the search space is combinatorial in the number of skilled people available and the size of the team. Accordingly, manager 104 uses an ordering for the criterion in Equation 22 on the set of all people in the organization that helps constrain the problem, where the ordering is obtained from the class membership and group co-memberships of the people. For example, for a team of size two, the set of possible teams can be divided into subsets based upon the class and group memberships of the people in the team. A coarse division is shown in FIG. 10.

As depicted in FIG. 10, the set of teams can be further subdivided into finer grids. The search for a highly cohesive team starts from the upper right hand corner of the grid. Thus, a smaller number of candidate teams need to be evaluated for selection.

In some alternative embodiments, as part of the evaluation of the possible teams, manager 104 considers other selection criteria, such as the expertise area of each person, the availability of each person, the affective state (e.g., friendly, angry, etc.) of each communication between people, and so forth. As those who are skilled in the art will appreciate, some of the criteria can be applied prior to evaluating the cohesiveness, while some of the criteria can be applied after evaluating the cohesiveness.

At task 902, manager 104 transmits information about the selected team to one or more endpoints 102-1 through 102-P. As those who are skilled will appreciate, the transmitted information can be used to inform one or more people in an organization about who to pull together as part of a team to perform a task. In some alternative embodiments, manager 104 can transmit information about the selected team or teams to another data-processing system, such as call-processing server 103. Server 103, for example, can use the information to set up a call that involves the endpoints of the people identified as being part of the selected team.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   determining for each person in an organization, class membership probabilities for a plurality of classes and group membership probabilities for a plurality of groups, wherein the class membership probabilities are based on each person's number of incoming communications and outgoing communications, and wherein group membership probabilities are based on each person's distribution of interactions;
   determining, via a processor, an expected value of relationship strength between each pair of people in the organization based on respective group membership probabilities and respective class membership probabilities; and
   based on the expected value of relationship strength between each pair of people in the organization, forming a cohesive team of people from the organization selected for a communication task.

2. The method of claim 1, wherein the class membership probabilities and the group membership probabilities are based on communication statistics associated with each person in the organization.

3. The method of claim 1, wherein a membership probability associated with a first class from the plurality of classes is characterized by a first density of communications, and wherein a membership probability associated with a second class from the plurality of classes is characterized by a second density of communications.

4. The method of claim 1, wherein a membership probability associated with a first group from the plurality of groups is characterized by a first distribution of communications within the first group relative to communications outside the first group, and wherein a membership probability associated with a second group from the plurality of groups is characterized by a second distribution of communications within the second group relative to communications outside the second group.

5. The method of claim 1, wherein the expected value of relationship strength between each pair of people comprises an expectation of a number of communications between each pair of people.

6. The method of claim 1, wherein the expected value of relationship strength between each pair of people in the organization is further based on a communication effectiveness.

7. A method comprising:
   determining for each person in an organization, class membership probabilities for a plurality of classes and group membership probabilities for a plurality of groups, wherein the class membership probabilities are based on each person's number of incoming communications and outgoing communications, and wherein group membership probabilities are based on each person's ratio of incoming and outgoing communications to members of each of the plurality of groups to each person's total number of incoming and outgoing communications;
   determining, via a processor, an expected value of relationship strength between each pair of people in the organization based on respective group membership probabilities and respective class membership probabilities; and
   based on the expected value of relationship strength between each pair of people in the organization, forming a cohesive team of people from the organization selected for a communication task.

8. The method of claim 7, wherein a membership probability associated with a first group from the plurality of groups is characterized by a first distribution of communications within the first group relative to communications outside the first group, and wherein a membership probability associated with a second group from the plurality of groups is characterized by a second distribution of communications within the second group relative to communications outside the second group.

9. The method of claim 7, wherein the expected value of relationship strength between each pair of people comprises an expectation of a number of communications between each pair of people.

10. The method of claim 7, further comprising receiving communication statistics associated with each person's incoming and outgoing communications.

11. The method of claim 10, wherein at least one of the class membership probabilities and the group membership probabilities are based the communication statistics.

12. A method comprising:
    receiving for each person in an organization, a first value, of the comprising a first number of outgoing communications and a second value, of the comprising a second number of incoming communications;
    determining for each person in the organization, class membership probabilities for a plurality of classes and group membership probabilities for a plurality of groups, wherein the class membership probabilities are based on each person's number of incoming communications and outgoing communications, and wherein group membership probabilities are based on each person's distribution of interactions;
    determining, via processor, an expected an value of relationship strength between each pair of people in the organization based on respective group membership probabilities and respective class membership probabilities; and based on the expected value of relationship strength between each pair of people in the organization, forming a cohesive team of people from the organization selected for a communication task.

13. The method of claim 12, wherein the group membership probabilities are further based on each person's ratio of incoming and outgoing communications to members of each of the plurality of groups to each person's total number of incoming and outgoing communications.

14. The method of claim 13, wherein the class membership probabilities and the group membership probabilities are based on communication statistics associated with each person in the organization.

15. The method of claim 13, wherein the expected value of relationship strength between each pair of people in the organization is further based on an effectiveness of communication.

16. The method of claim 12, wherein the expected value of relationship strength between each pair of people comprises an expectation of number of communications between each pair of people.

17. The method of claim 12, wherein a membership probability associated with a first class from the plurality of classes is characterized by a density of communications.

18. The method of claim 12, wherein the outgoing communications and the incoming communications occur during a predetermined period of time.

19. A method comprising:
receiving, communication statistics associated incoming and outgoing communications for each person in an organization;
determining for each person in an organization, class membership probabilities for a plurality of classes and group membership probabilities for a plurality of groups, wherein the class membership probabilities are based on each person's number of incoming communications and outgoing communications, and wherein group membership probabilities are based on each person's ratio of incoming and outgoing communications to members of each of the plurality of groups to each person's total number of incoming and outgoing communications;
determining, via a processor, an expected value of relationship strength between each pair of people in the organization based on respective group membership probabilities and respective class membership probabilities; and
based on the expected value of relationship strength between each pair of people in the organization, forming a cohesive team of people from the organization selected for a communication task.

20. The method of claim 19, wherein the expected value of relationship strength between each pair of people comprises an expectation of a number of communications between each pair of people.

21. The method of claim 19, wherein the expected value of relationship strength between each pair of people in the organization is further based on a communication effectiveness.

* * * * *